(12) United States Patent
Choi

(10) Patent No.: US 7,677,658 B2
(45) Date of Patent: Mar. 16, 2010

(54) AUTOMOTIVE HEADREST

(75) Inventor: Soon Bong Choi, Geongeon-Dong, Sangnok-Gu, 101-702 Seohae Apt., Ansan-Si Gyeonggi-Do (KR) 426-706

(73) Assignees: Soon Bong Choi, Ansan-Si (KR); Chun Bae Kim, Hwasung-Si (KR)

( * ) Notice: Subject to any disclaimer, the term of this patent is extended or adjusted under 35 U.S.C. 154(b) by 0 days.

(21) Appl. No.: 12/097,156

(22) PCT Filed: Oct. 17, 2006

(86) PCT No.: PCT/KR2006/004189

§ 371 (c)(1),
(2), (4) Date: Jun. 12, 2008

(87) PCT Pub. No.: WO2007/073034

PCT Pub. Date: Jun. 28, 2007

(65) Prior Publication Data

US 2008/0296952 A1    Dec. 4, 2008

(30) Foreign Application Priority Data

Dec. 22, 2005  (KR) .................. 10-2005-0127756

(51) Int. Cl.
*B60N 2/427*  (2006.01)
*B60R 21/055*  (2006.01)
(52) U.S. Cl. .................. 297/216.12; 297/391; 297/404
(58) Field of Classification Search .......... 297/397, 297/404, 216.12, 391
See application file for complete search history.

(56) References Cited

U.S. PATENT DOCUMENTS

| | | | | |
|---|---|---|---|---|
| 2,812,802 A | * | 11/1957 | Gielow ............... | 297/396 |
| 2,828,810 A | * | 4/1958 | Barecki et al. ....... | 297/396 |
| 4,278,291 A | | 7/1981 | Asai | |
| 4,304,439 A | * | 12/1981 | Terada et al. ........ | 297/391 X |
| 4,370,898 A | * | 2/1983 | Maruyama ........... | 74/540 |
| 4,558,903 A | * | 12/1985 | Takagi ............... | 297/408 |
| 4,576,413 A | * | 3/1986 | Hatta ................. | 297/391 X |
| 4,640,549 A | * | 2/1987 | Yokota ............... | 297/410 |
| 4,674,792 A | * | 6/1987 | Tamura et al. ........ | 297/408 |
| 4,674,797 A | * | 6/1987 | Tateyama ............ | 297/391 X |

(Continued)

FOREIGN PATENT DOCUMENTS

JP    11-262426    9/1999

(Continued)

*Primary Examiner*—Rodney B White
(74) *Attorney, Agent, or Firm*—IPLA P.A.; James E. Bame

(57) ABSTRACT

Disclosed herein is an automotive headrest, which is constructed so that the automotive headrest is not tilted, but is displaced in a straight line in only one direction in a rectilinear motion, and is then returned to its original position. The automotive headrest includes a stay rod having vertical parts secured to a seat, and a horizontal part coupling the vertical parts to each other. A horizontal guide frame is secured to the horizontal part of the stay rod. A ratchet slider is movably mounted to the horizontal guide frame. A ratchet pawl locks or releases the ratchet slider. A tension spring returns the displaced ratchet slider to its original position. A ratchet spring provides tensile force to the ratchet pawl.

4 Claims, 5 Drawing Sheets

U.S. PATENT DOCUMENTS

| | | | |
|---|---|---|---|
| 4,678,232 A * | 7/1987 | Ishida et al. | 297/391 X |
| 4,733,913 A * | 3/1988 | Tateyama | 297/391 X |
| 5,228,749 A * | 7/1993 | Harrell | 297/391 X |
| 5,236,245 A * | 8/1993 | Harrell | 297/391 X |
| 5,236,246 A * | 8/1993 | Harrell | 297/391 X |
| 5,238,295 A * | 8/1993 | Harrell | 297/391 X |
| 5,590,933 A * | 1/1997 | Andersson | 297/408 |
| 6,000,760 A * | 12/1999 | Chung | 297/408 |
| 6,045,181 A * | 4/2000 | Ikeda et al. | 297/216.12 |
| 6,688,697 B2 * | 2/2004 | Baumann et al. | 297/391 |
| 7,455,363 B2 * | 11/2008 | Chung, Hae Il | 297/391 X |

FOREIGN PATENT DOCUMENTS

| | | |
|---|---|---|
| KR | 1020050109150 | 11/2005 |

* cited by examiner

[Fig. 1]
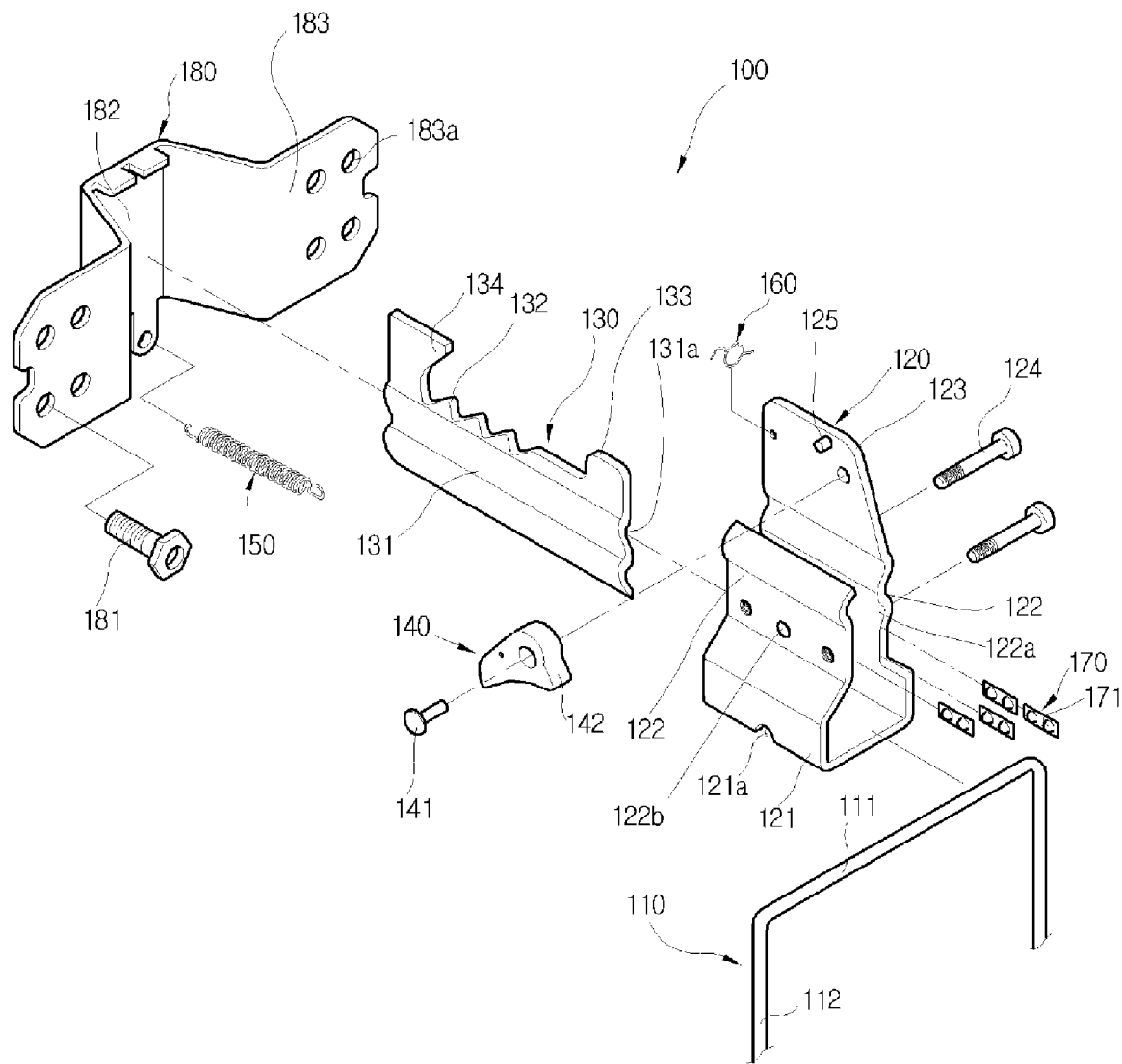

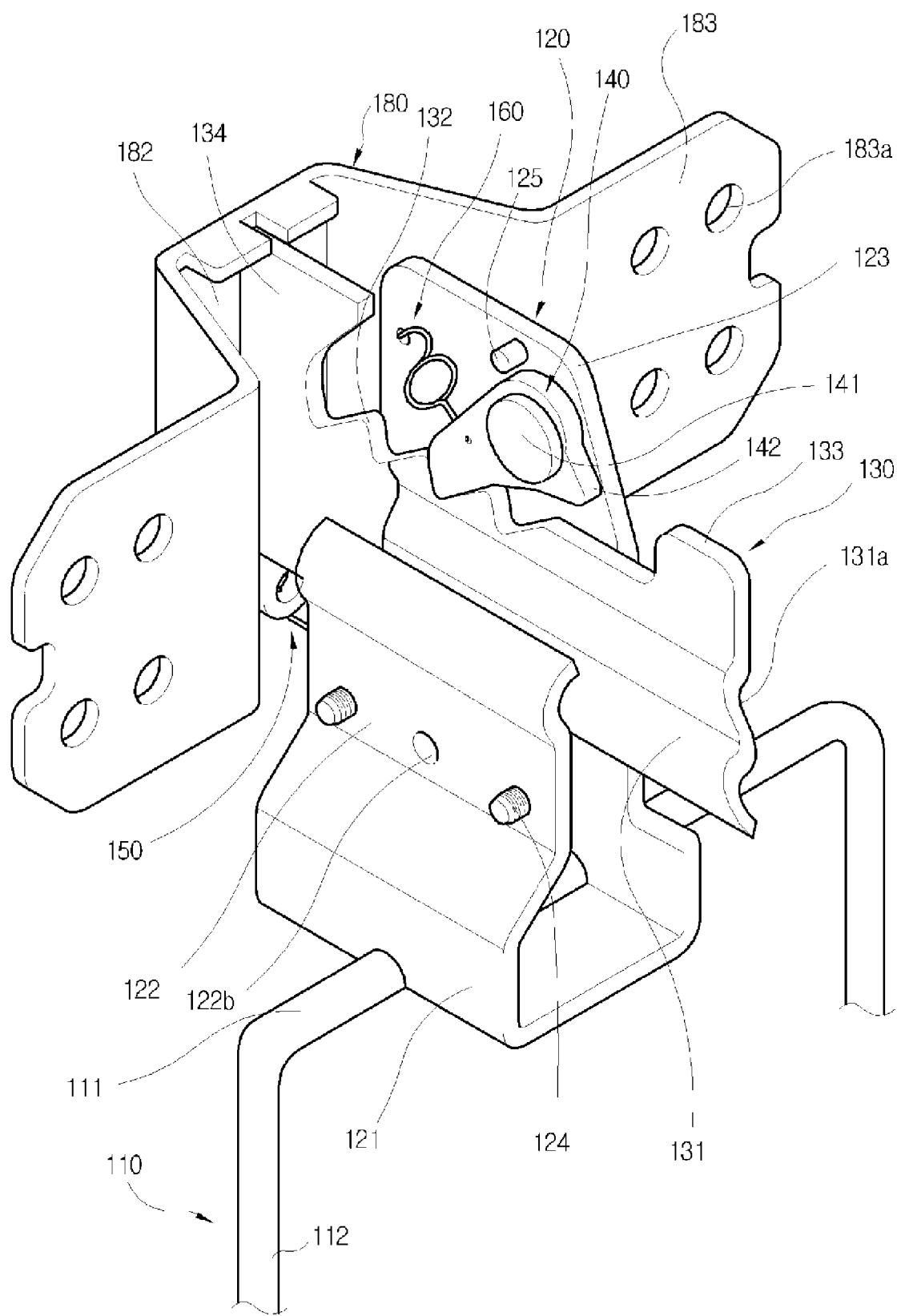
[Fig. 2]

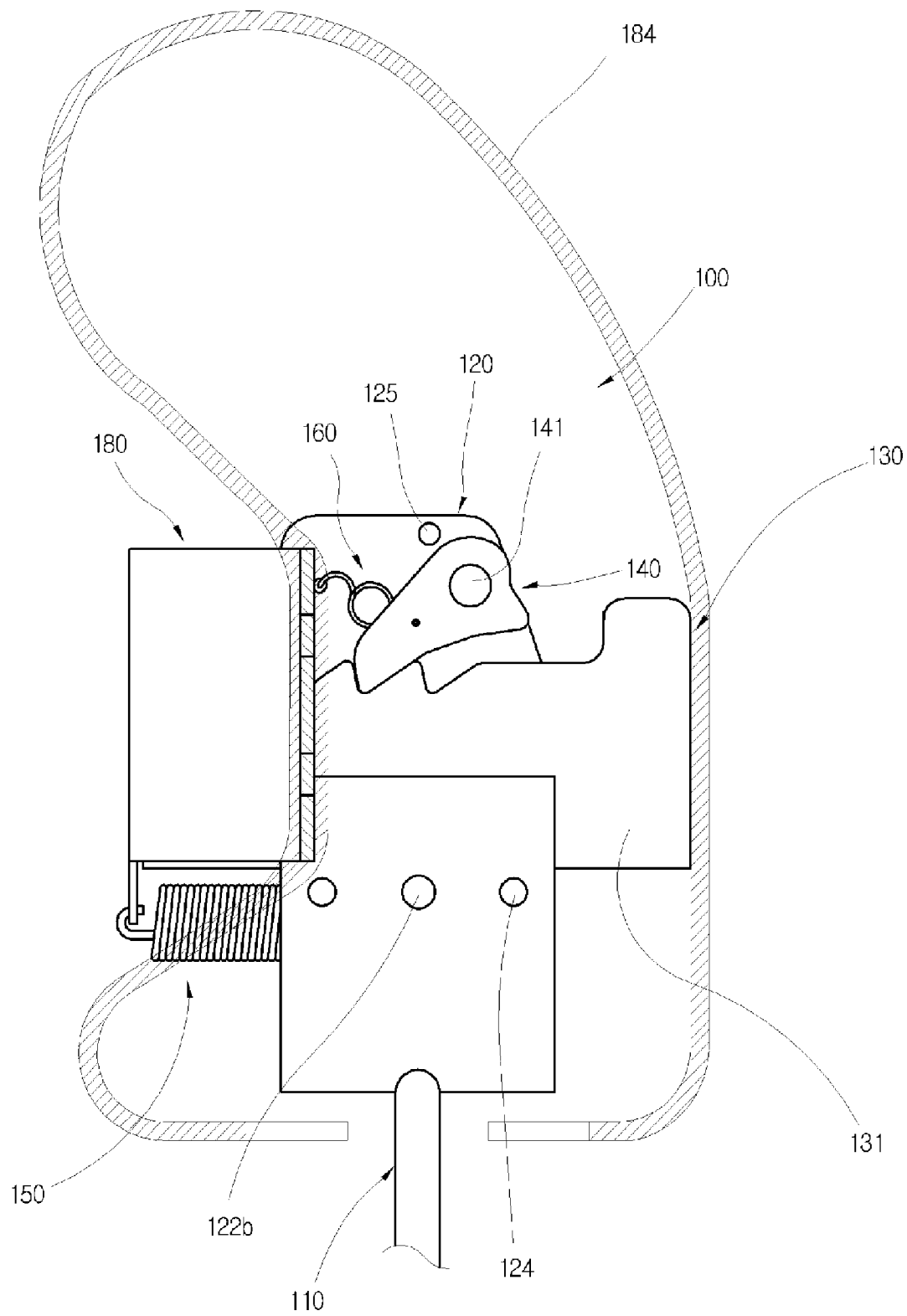
[Fig. 3]

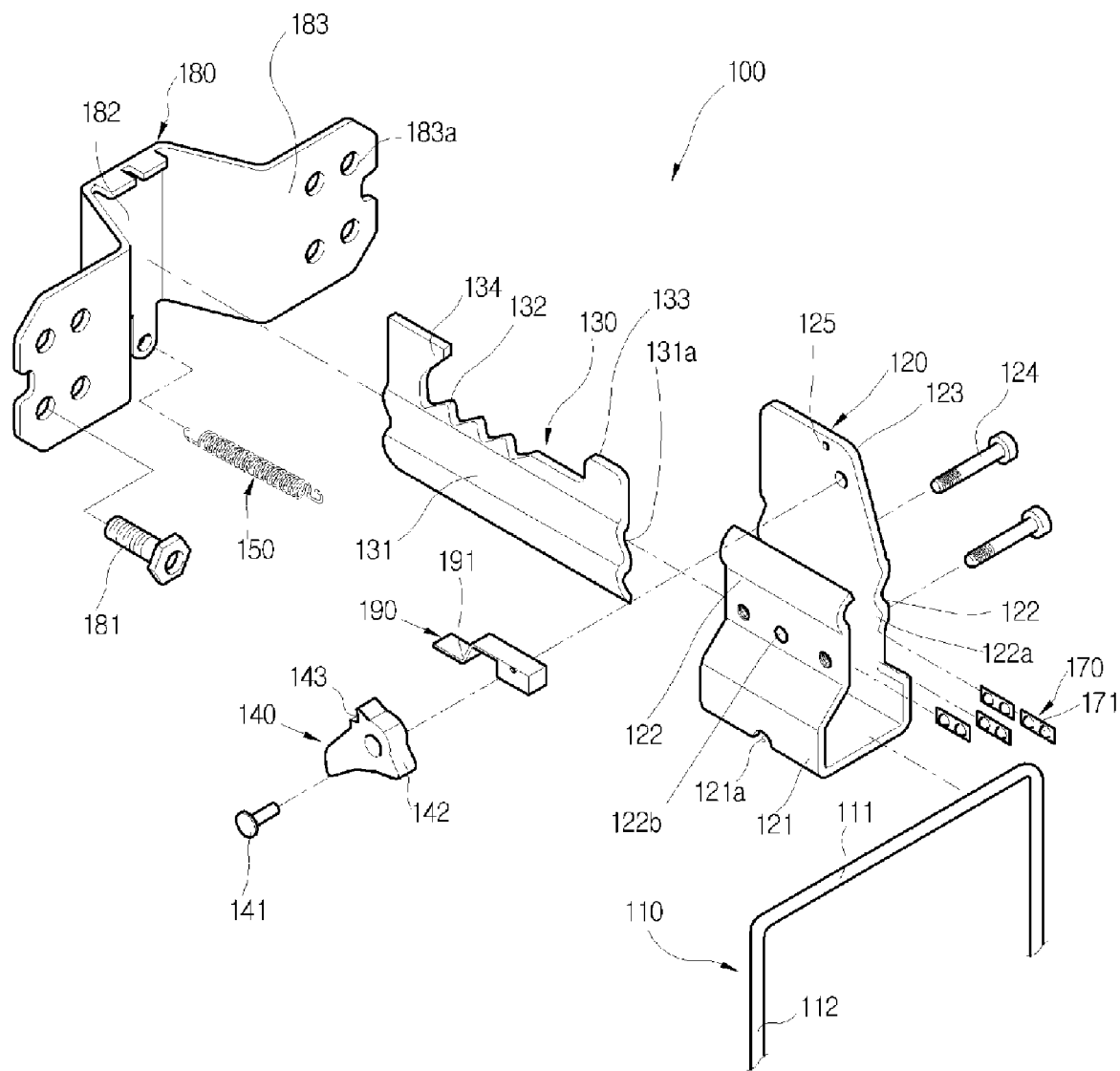
[Fig. 4]

[Fig. 5]
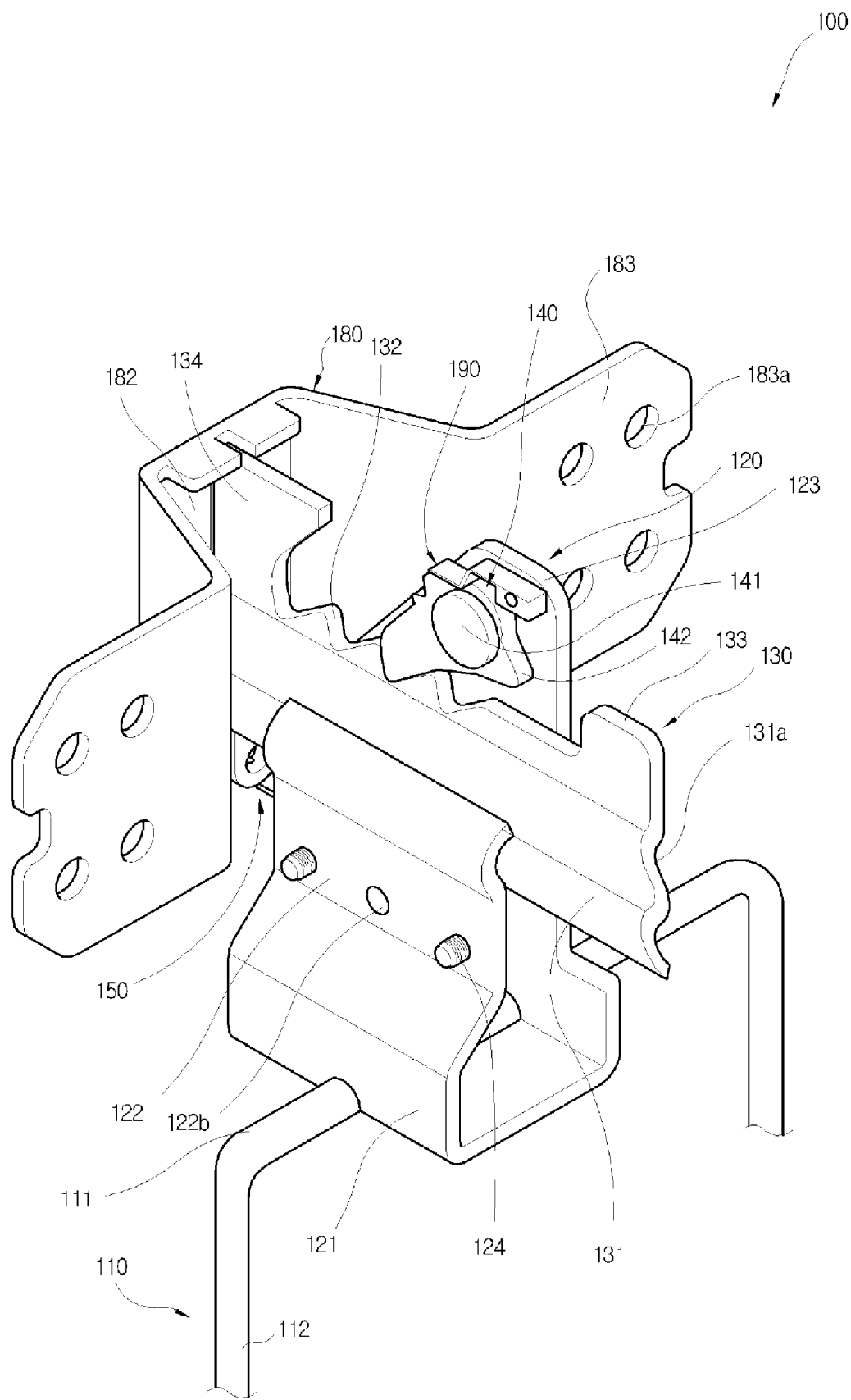

AUTOMOTIVE HEADREST

TECHNICAL FIELD

The present invention relates, in general, to automotive headrests and, more particularly, to an automotive headrest, which is constructed so that the automotive headrest is not tilted, but is displaced in a straight line in only one direction in a rectilinear motion, and is then returned to its original position.

BACKGROUND ART

Generally, an automotive headrest is a device that is attached to the top of a seat in such a way as to move up and down and tilt to correspond to the height of a passenger's head, thus functioning to support his or her head. Most such automotive headrests are constructed to be tilted around an axis by a tilting mechanism. In the case where a vehicle is hit from behind, the automotive headrest serves to support the back of the head of a passenger who is sitting on a seat, in addition to preventing his or her neck from being injured due to the impact.

However, a conventional automotive headrest has a complicated structure, because it has both a tilting mechanism for tilting manipulation and an elevating mechanism for height adjustment. Thus, the conventional automotive headrest is problematic in that the manufacturing cost and the manufacturing period are increased, so that working efficiency is lowered.

DISCLOSURE OF INVENTION

Technical Problem

Accordingly, the present invention has been made keeping in mind the above problem occurring in the prior art, and an object of the present invention is to provide an automotive headrest, which is constructed so that the automotive headrest is not tilted, but is displaced in a straight line in only one direction in a rectilinear motion, and is then returned to its original position, and which has a simple construction and is securely assembled and operated, thus enhancing the reliability of the product and being superior in terms of price competition.

Technical Solution

In order to accomplish the object, the present invention provides an automotive headrest, including a stay rod which having vertical parts secured to a seat and a horizontal part coupling the vertical parts to each other; a horizontal guide frame secured to the horizontal part of the stay rod; a ratchet slider movably mounted to the horizontal guide frame; a ratchet pawl locking or releasing the ratchet slider; a tension spring returning the displaced ratchet slider to an original position thereof; and a ratchet spring providing tensile force to the ratchet pawl.

The horizontal guide frame includes a base part secured to the horizontal part of the stay rod, a pair of guide parts extending vertically from the base part, and a mounting part extending upwards from either of the guide parts. At least one guide groove is provided on an inner surface of each of the guide parts.

The ratchet slider includes a horizontal sliding piece passing between the guide parts of the horizontal guide frame, the horizontal sliding piece includes on an outer surface thereof a slide groove which corresponds to the guide groove of the horizontal guide frame, and includes on an upper end thereof a plurality of teeth. A releasing step and a catching step are provided on front and rear ends of the teeth, and a mounting bracket coupled to a headrest cover is provided on an end of the horizontal sliding piece.

The automotive headrest further includes at least one bearing plate between the horizontal guide frame and the ratchet slider.

Screw holes are formed in the guide parts of the horizontal guide frame to correspond to each other, and a spacing bolt is fastened to the screw holes to keep an interval between the guide parts of the horizontal guide frame constant.

ADVANTAGEOUS EFFECTS

As described above, an automotive headrest according to the present invention has a simpler construction and is more securely assembled and operated, in comparison with a conventional automotive headrest, thus enhancing the reliability of a product, and considerably reduces the number of required parts and simplifies an assembly process, thus reducing the manufacturing cost, therefore increasing productivity and being superior in terms of price competition.

BRIEF DESCRIPTION OF THE DRAWINGS

FIG. 1 is an exploded perspective view showing an automotive headrest, according to an embodiment of the present invention;

FIG. 2 is a perspective view showing the assembled state of the automotive headrest, according to the present invention;

FIG. 3 is a side view showing the automotive headrest, according to the present invention;

FIG. 4 is a perspective view showing an automotive headrest, according to another embodiment of the present invention; and FIG. 5 is a perspective view showing the assembled state of the automotive headrest of FIG. 4.

MODE FOR THE INVENTION

Hereinafter, an automotive headrest according to the present invention will be described in detail with reference to the accompanying drawings.

FIG. 1 is an exploded perspective view showing an automotive headrest, according to an embodiment of the present invention, FIG. 2 is a perspective view showing the assembled state of the automotive headrest, according to the present invention, and FIG. 3 is a side view showing the automotive headrest, according to the present invention.

As shown in the drawings, an automotive headrest 100 according to the present invention includes a stay rod 110, a horizontal guide frame 120, a ratchet slider 130, a ratchet pawl 140, a tension spring 150, and a ratchet spring 160. The stay rod 110 is provided with vertical parts 112 which are mounted to a seat, and a horizontal part 111 which couples the vertical parts 112 to each other. The horizontal guide frame 120 is secured to the horizontal part 111 of the stay rod 110. The ratchet slider 130 is movably installed to the horizontal guide frame 120. The ratchet pawl 140 locks or releases the ratchet slider 130. The tension spring 150 returns the displaced ratchet slider 130 to its original position. The ratchet spring 160 provides tensile force to the ratchet pawl 140.

The stay rod 110 includes a pair of vertical parts 112 and the horizontal part 111, which couples the vertical parts 112 to each other. One end of each vertical part 112 is coupled to the seat.

The horizontal guide frame 120 is manufactured by bending a steel sheet having a predetermined thickness into a trapezoidal shape. A base part 121 is provided on the lower portion of the horizontal guide frame, and is secured to the stay rod 110. A pair of guide parts 122, each having a guide groove 122a which is curved in an arc shape, is provided in the middle portion of the horizontal guide frame. Further, a mounting part 123 is provided on the upper portion of the horizontal guide frame and extends vertically.

The guide parts 122 are provided to be parallel to each other. One or more guide grooves 122a are provided on the inner surface of each guide part 122 to be parallel to each other. The mounting part 123 extends vertically from the upper end of one of the guide parts 122.

Preferably, a seating groove 121a is formed in the bottom of the base part 121 of the horizontal guide frame 120, thus allowing the horizontal guide frame to be more securely welded to the stay rod 110.

The ratchet slider 130 has a horizontal sliding piece 131 which is installed between the guide parts 122 of the horizontal guide frame 120 to move forwards and backwards in a horizontal direction. The horizontal sliding piece 131 has on the outer surface thereof a slide groove 131a which corresponds to each guide groove 122a of the horizontal guide frame 120.

Further, a plurality of teeth 132 is provided on the upper end of the ratchet slider 130. A releasing step 133 and a catching step 134 are provided on the front end and the rear end, respectively, of the teeth 132.

The ratchet pawl 140 is pivotably mounted to the mounting part 123 of the horizontal guide frame 120 using a hinge pin 141, and selectively engages with or disengages from the teeth 132 of the ratchet slider 130. A releasing protrusion 142 is provided on the rear end of the ratchet pawl and is caught by the releasing step 133 of the ratchet slider 130.

As shown in FIGS. 1 to 3, the ratchet spring 160 comprises a torsion spring, and provides tensile force to the ratchet pawl 140. The ends of the ratchet spring are coupled to the ratchet pawl 140 and the mounting part 123 of the horizontal guide frame 120, respectively. Thereby, the ratchet spring allows the ratchet pawl 140 to elastically rotate and engage with the teeth 132 of the ratchet slider 130, and keeps the ratchet pawl 140, which is rotated beyond a predetermined range, disengaged from the teeth 132.

The tension spring 150 is coupled at both ends thereof to the ratchet slider 130 and the horizontal guide frame 120. Thus, the tension spring returns the ratchet slider 130, which has moved horizontally along the guide parts 122 of the horizontal guide frame 120, to its original position.

More preferably, as shown in FIG. 1, one end of the tension spring 150 is coupled to a mounting bracket 180 which is provided on the front end of the ratchet slider 130. The mounting bracket 180 is manufactured by bending and cutting a steel sheet having a predetermined thickness.

The mounting bracket 180 has on a middle portion thereof a coupling part 182 to which an end of the horizontal sliding piece 131 is integrally coupled. Mounting wings 183 are provided on both sides of the mounting bracket 180, and are mounted to a headrest cover 184.

The coupling of the mounting wings 183 of the mounting bracket 180 to the headrest cover 184 is as follows. That is, it is preferable that the mounting wings 183 be partially embedded in the headrest cover 184 to be integrated with the headrest cover, when the headrest cover 184 is molded. If necessary, the mounting bracket may be detachably fastened to the headrest cover 184 using bolts 181. To this end, a plurality of bolt holes 183a is formed in the mounting wings 183 so that the bolts 181 are fastened to the corresponding bolt holes.

Preferably, the horizontal sliding piece 131 of the ratchet slider 130 is integrated with the mounting bracket 180 into a single structure through welding. Alternatively, the horizontal sliding piece may be detachably fastened to the mounting bracket using bolts or other fastening means.

Further, screw holes 122b are formed in the guide parts 122 of the horizontal guide frame 120 in such a way as to correspond to each other. Spacing bolts 124 are inserted into the screw holes 122b to keep the interval between the guide parts 122 of the horizontal guide frame 120 constant.

A stopper 125 is provided on the mounting part 123 of the horizontal guide frame 120 to be adjacent to the ratchet pawl 140, and limits the rotation of the ratchet pawl 140, which is removed from the teeth 132 of the ratchet slider 130 by the ratchet spring 160.

Meanwhile, the automotive headrest of the present invention may further include bearing plates 170 which are interposed between the guide grooves 122a of the horizontal guide frame 120 and the slide grooves 131a of the ratchet slider 130. Each bearing plate 170 is provided with a rolling element 171, such as a ball or a roller. The bearing plates 170 allow the ratchet slider 130 to slide more easily.

The operation of the automotive headrest 100 according to the present invention, which is constructed as described above, is as follows.

When a user desires to horizontally move the headrest cover 184 mounted to the top of the seat, the headrest cover 184 is pushed forwards.

At this time, the ratchet slider 130, which is coupled so as to be operated in conjunction with the headrest cover 184 via the mounting bracket 180, moves forwards in a horizontal direction. Simultaneously, the ratchet pawl 140, which is pivotably coupled to the mounting part 123 of the horizontal guide frame 120, slides off of the first tooth 132 of the ratchet slider 130 and encounters the second tooth 132. At this time, the ratchet pawl 140 is elastically rotated downwards by the ratchet spring 160, and is inserted into the second tooth 132 of the ratchet slider 130 to engage with the second tooth, thus locking the headrest 100 in the displaced position. Such a process is repeated a number of times corresponding to the number of teeth 132 of the ratchet slider 130, and the headrest 100 is moved and locked to a desired position.

Further, when a user desires to return the displaced headrest cover 184 to its original position, he or she continues to push the headrest 100 forwards. In this case, the releasing step 133 pushes the releasing protrusion 142 of the ratchet pawl 140, so that the ratchet pawl 140 slides off of the final tooth 132. At this time, if the ratchet pawl 140 is rotated beyond a predetermined range, the elastic force of the ratchet spring 160, which biases the ratchet pawl 140 downwards, acts in the opposite direction, thus biasing the ratchet pawl 140 upwards. Thereby, the ratchet pawl 140 engages with the stopper 125, and the ratchet pawl 140 is completely removed from the teeth 132 of the ratchet slider 130.

Subsequently, when force pushing the headrest 100 forwards is eliminated, the ratchet slider 130 slides backwards due to the elastic force of the tension spring 150, so that the headrest cover 184 is returned to its original position. At this time, the ratchet pawl 140, locked to the stopper 125 by the ratchet spring 160, contacts the catching step 134 of the ratchet slider 130, and rotates downwards to be inserted into the first tooth 132. Simultaneously, the ratchet spring 160 downwardly biases the ratchet pawl 140, rotated beyond a predetermined range, so that the ratchet pawl 140 remains in the first tooth 132 of the ratchet slider 130. In such a state, a user can adjust the position of the headrest 100 as desired.

Meanwhile, as shown in FIGS. 4 and 5, a ratchet spring 190 comprising a plate spring may be mounted to the mounting part 123 of the horizontal guide frame 120, in place of the ratchet spring 160 comprising the torsion spring.

The ratchet spring 190 comprising the plate spring is secured at one end thereof to the stopper 125, and has a locking step 191.

Further, a locking protrusion 143 is provided on the ratchet pawl 140 to engage with or disengage from the locking step 191 of the plate spring 190. Thus, when the ratchet slider 130 slides, the ratchet pawl 140 is rotated by the releasing step 133 and the catching step 134, so that the locking protrusion 143 of the ratchet pawl 140 is locked to or removed from the locking step 191 of the plate spring 190.

The invention claimed is:

1. An automotive headrest, comprising:
    a stay rod having vertical parts secured to a seat, and a horizontal part coupling the vertical parts to each other;
    a horizontal guide frame secured to the horizontal pan of the stay rod;
    a ratchet slider movably mounted to the horizontal guide frame;
    a ratchet pawl, pivotably mounted to the horizontal guide frame, for locking or releasing the ratchet slider;
    a tension spring returning the displaced ratchet slider to an original position thereof; and
    a ratchet spring providing tensile force to the ratchet pawl, wherein the horizontal guide frame comprises:
    a base part secured to the horizontal part of the stay rod;
    a pair of guide parts extending vertically from the base part; and
    a mounting part extending upwards from either of the guide parts, and at least one guide groove is provided on an inner surface of each of the guide parts,
    wherein the ratchet slider further comprises a plurality of teeth, which the ratchet pawl is selectively engages with or disengages from.

2. The automotive headrest according to claim 1, wherein the ratchet slider comprises a horizontal sliding piece passing between the guide parts of the horizontal guide frame, and wherein the ratchet slider further comprises on an upper end thereof the plurality of teeth, a releasing step and a catching step provided on front and rear ends of the teeth, and a mounting bracket coupled to a headrest cover provided on an end of the horizontal sliding piece, wherein the horizontal sliding piece comprises on an outer surface thereof a slide groove which corresponds to the guide groove of the horizontal guide frame.

3. The automotive headrest according to claim 2, further comprising: at least one bearing plate provided between the horizontal guide frame and the ratchet slider.

4. The automotive headrest according to claim 1, wherein screw holes are formed in the guide parts of the horizontal guide frame to correspond to each other, and a spacing bolt is fastened to the screw holes to keep an interval between the guide parts of the horizontal guide frame constant.

* * * * *